United States Patent Office 3,309,341
Patented Mar. 14, 1967

3,309,341
AMINE-MODIFIED URON RESINS
David H. Abrahams, New Rochelle, and Leo Goldberg, Bayside, N.Y., assignors to Dexter Chemical Corporation, a corporation of New York
No Drawing. Filed June 19, 1963, Ser. No. 288,904
16 Claims. (Cl. 260—70)

This invention relates to a process and composition which is particularly useful in the treating of textiles, in connection with which use the invention will be illustrated.

Uron resins are used extensively in the treatment of textile fabrics for imparting shrinkage control, crease resistance and smooth drying properties. The uron resins are made conventionally by the condensation of urea with formaldehyde to form initially tetramethylol urea. Dehydration of tetramethylol urea, with elimination of one mole of water between two adjacent N,N'-methylol groups, yields a monocyclic N,N'-bis(methylol) ring compound of the formula

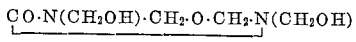

namely, N,N'-bis(methylol) uron. The two methylol groups of N,N'-bis(methylol) uron are then etherified by acidic reaction with an aliphatic alcohol having one to four carbon atoms to yield a diether of the formula

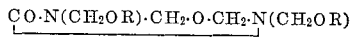

namely, N,N'-bis(alkoxymethyl) uron which is the uron resin in the form used for treatment of textiles conventionally. The preparation of such uron resins is described by Kadowaki (Bull. Chem. Soc. (Japan), 11, 248–61 (1936)), and as used herein the term uron resin is intended to refer to N,N'-bis(alkoxymethyl) urons of the formula given above.

In the use of uron resins made by the conventional process described above, as disadvantage arises in that certain unreacted residues in the uron resins combine with chlorine during chlorine bleaching of the textiles that have been treated with the resin. The chlorine thus retained, however, is unstable and only loosely held. Consequently, during the ordinary processing to which the textiles are subjected during use, and particularly at warm temperatures as during ironing and the like, the chlorine is liberated in the form of hydrochloric acid. The hydrochloric acid attacks the fibers of the textile material, seriously lowering the tensile strength, and the textile material may also yellow or otherwise become marred because of the degradative effect of the acid.

We have now discovered that this disadvantage of retention of unstable chlorine and subsequent generation of hydrochloric acid by manufactured uron resins can be avoided by reacting the uron resin with an amine which apparently modifies, converts or in some way inactivates the uron resin residues which are responsible for chlorine retention and subsequent generation thereof. As a result of our process, we have reduced the loss of tensile strength in the ten launderings of a fabric by standard techniques to approximately one-third of the loss in strength which is usually otherwise encountered in uron resin-treated textiles.

Briefly stated, the invention comprises the modification of a uron resin composition by reacting therewith a water soluble aliphatic amine and the improved uron resin composition thus obtained. In the preferred embodiment of the invention, we use for best results a saturated primary amine.

Once the process has been disclosed, various explanations may be advanced for the mechanism by which the benefit is obtained. We consider that the effect is due to the modification or inactivation in the uron resin composition of certain unreacted non-uron resin residues, these being particularly the polymethylol derivatives of urea which have not been converted completely to the uron structure and which are unavoidably present in all manufactured uron resins. The reaction with an amine in accordance with the invention does not in any way remove the methylol of residues but converts them into a form which is not harmful in the textile fabric bleaching process and is actually beneficial in the improved properties given to the treated textile.

As to materials and conditions used in making the uron resins, these are conventional up to the stage when we introduce an amine in accordance with the invention. For best yields of the uron resin, we use formaldehyde for condensation with urea in the proportion of at least 4 mols to one of the urea. The alkali used in this condensation is ordinarily sodium or potassium hydroxides which are economical and effective. Condensation of the urea and formaldehyde is continued until maximum yield of tetramethylol urea has been obtained and thereafter the mixture is concentrated by vaporization of water at atmospheric or reduced pressure to eliminate one mol of water between adjacent methylol groups and form N,N'-bis(methylol) uron in conventional manner.

Thereafter, alcohol and acid are added to establish the pH at a suitable level for etherification of the remaining methylol groups on the uron with the alcohol, as for instance addition of sufficient sulfric, hydrochloric or other acid to reduce the pH at least to about 3.5. The alcohol used for etherification may be any aliphatic alcohol having one to four carbon atoms, for example, methanol, ethanol, propanol, butanol, isopropanol and the like. The etherification reaction may be conducted at temperatures from room temperature to reflux until no further substantial etherification occurs. Following formation of the N,N'-bis(alkoxymethyl) uron diether, we may boil away the unconsumed alcohol or postpone this boiling off step until the reaction with the amine. In any case, we neutralize the prepared uron resin as by adding sufficient sodium or potassium hydroxide to adjust the pH to at least 7 or higher.

In accordance with the invention, we now admix an amine and react the same with the prepared uron resin. This amine should be water soluble and may be an alkyl, alkanol, alkoxyalkyl, alkylene or cycloalkylamine having from one to six carbon atoms. Examples of amines which may be used are: any $C_{1-4}$ alkyl amine such as ethyl, methyl, propyl or butyl amines; or alkanol amines having two to four carbon atoms in each alkanol group, for example, ethanol, propanol and butanol amines; alkoxyalkyl amines such as methoxymethyl, methoxyethyl and ethoxyethyl amines; polyamines of $C_{2-4}$ alkylene groups, examples being ethylene diamine, diethylene triamine, the propylene amines and also the amylene amines; and finally the cycloalkyl amines of which examples are cyclopentyl and cyclohexyl amines.

As to proportions, we use an amount of amine which is stoichiometrically equivalent to all unreacted hydroxyl groups in the uron resin composition plus a slight excess. Suitable proportions are from about 0.04 to 0.8 and preferably from about 0.06 to 0.6 mol of monoamine, or equivalent of a di- or other polyamine, for each mol of urea that was used in making the original urea formaldehyde condensate (tetramethylol urea). Addition of the amine raises the pH of the mixture up to about 9.0 or higher, depending on the materials being used in a specifier embodiment, and the pH will decrease as reaction proceeds between the amine and the non-uron resin constituents of the mixture. The uron resin composition and amine are maintained mixed together at a temperature from about room to atmospheric reflux temperatures, and preferably at about 60° to 80° C., until reaction subsides which will be evident from leveling off of the pH without further appreciable decrease. The uron resin composition may then be used for treatment of textile materials without separation of any residual unreacted amounts of amine that may remain therein.

The modified uron resin may be applied to textile materials in the conventional manner that is customarily used for uron resin. The resin, with the usual catalysts, is applied and then dried and cured, separateyy or in a combined operation, to develop the properties of shrinkage control, crease resistance and smooth drying. Normally, a temperature range of 180° to 450° F. and heating period of about 1 to 10 minutes are employed. These are satisfactory for applying the amine- modified uron resins of the invention to textile materials.

The invention will be further illustrated with the following specific examples, the proportions therein being expressed by weight unless specifically stated to the contrary.

*Example 1*

To a mixture containing 2.64 mols of urea and 12.65 mols of formaldehyde was added sufficient sodium hydroxide to bring the pH to 10 and the mixture was then refluxed at atmospheric pressure for about 1–1½ hours to form tetramethylol urea. At the end of this time, water was stripped from the mixture under vacuum and the resulting solution of N,N'-bis(methylol) uron resin was dissolved in 230 grams (7.2 mols) of methanol. The pH of the alcohol solution was adjusted to 2.5 with sulfuric acid and the solution was agitated for 1 hour at a temperature of 50° C. The sulfuric acid was then neutralized with sodium hydroxide.

To the resulting alcohol solution of N,N'-bis(methoxymethyl) uron resin was added 42 grams of 71.7% ethyl amine (0.67 mol). The resulting mixture was permitted to stand at room temperature for 1 hour then heated to 70° C. and held at that temperature for an additional 2 hours. Excess alcohol was removed from the mixture by vaporization at reduced pressure and the resulting syrupy liquid was diluted with water to 5% solids concentration by weight. The pH of this solution was adjusted to approximately 7 and 1% zinc nitrate catalyst, by weight of the solution, was added.

Cotton fabric was padded with the above-described solution and then dried at 140° F. for 10 minutes and cured at 340° F. for 1½ minutes. The cured fabric was given ten washes in boiling soap solution in accordance with the test "Dimensional Changes in Laundering of Woven and Knitted Textiles, Except Wool," Test No. 96–1960T, Test IV–B, described on pages B95–98 of The Technical Manual of the American Association of Textile Chemists and Colorists, 1962 edition, vol. 38.

Following these washes, the cured fabric was tested for percentage loss in tensile strength by the chlorine retention test method "Damage By Retained Chlorine," Test No. 92–1962, described on page B–92 of the above-identified reference. This test showed that the cured fabric lost 9% of its initial tensile strength, whereas a fabric similarly treated with the same uron resin, unreacted with an amine, showed a greater loss of 35% in the tensile strength.

*Example 2*

N,N'-bis(methoxymethyl) uron resin was prepared in the manner described in Example 1 except that excess methanol was stripped from the resin under reduced pressure following esterification, and the pH of the stripped resin was adjusted to a 9.7 with sodium hydroxide.

To the uron resin so prepared was then added 30 grams (0.49 mol) of monoethanol amine and the resulting solution was permitted to stand at room temperature for about 30 minutes. The mixture was then heated to 70° C. and held at that temperature for 3 hours and finally the mixture was diluted with water to form a solution containing 5% resin solids by weight. The pH of this solution was adjusted to approximately 7 with sulfuric acid and zinc nitrate catalyst added as in Example 1.

Cotton fabric was padded through this solution and laundered in ten boiling washes in the manner described in Example 1. Then the percentage loss in tensile strength was determined by the tests described in Example 1, and the results were a 11% loss in the initial tensile strength of the fabric. This was a substantial improvement over a similar fabric treated with the same uron resin, unreacted with an amine, which lost 35% of the original tensile strength.

*Example 3*

A uron resin is prepared in the manner described in Example 1 and to the alcoholic solution of uron resin is added 39.6 grams (0.40 mol) of cyclohexyl amine. The resulting mixture is held at room temperature for one-half hour and then heated to 75° C. for an additional 2¼ hours. After stripping off excess alcohol, the resulting material is diluted with water to 5% solids concentration by weight and the pH of the solution adjusted to approximately 7.

When applied to fabric material and tested in the manner described in Example 1 for damage due to retained chlorine, the foregoing composition gives substantially the same results as were noted for the composition of Example 1.

*Example 4*

Example 3 is repeated except that excess, unconsumed alcohol is first stripped from the uron resin and then 9.6 grams (0.16 mol) of ethylene diamine are mixed in and reacted with the uron resin.

The results of application to fabric material and testing for chlorine retention damage are substantially the same as noted in Example 1.

*Example 5*

N,N'-bis(methoxymethyl) uron resin is prepared in the manner described in Example 1 except that excess methanol is stripped from the resin under reduced pressure following etherification, and the pH of the stripped resin is adjusted to 9.7 with sodium hydroxide.

To the uron resin so prepared is then added 37.5 grams (0.50 mol) of methoxyethyl amine and the resulting solution permitted to stand at room temperature for about 30 minutes. The mixture is then heated to 70° C. and held at that temperature for 3 hours and finally the mixture is diluted with water to form a solution containing 5% resin solids by weight. The pH of this solution is adjusted to about 7 with sulfuric acid and zinc nitrate catalyst added as in Example 1.

Application and curing of this composition to fabric, and testing of the treated fabric by laundering in ten boiling washes and thereafter determining the loss in tensile strength, as in Example 1, shows that the treated fabric loses about 12% of the initial tensile strength. In contrast, a similar fabric treated with the same uron resin, unreacted with an amine, loses 35% of its original tensile strength.

In place of the alkoxyalkyl amine used in the preceding example, acetoxyalkyl amines having from one to six carbon atoms and in which the hydroxy group of the alkanol radical has been esterified may be used for reaction with uron resin in accordance with the invention.

It will be understood that it is intended to cover all changes and modifications of the preferred embodiments of the invention, herein chosen for the purpose of illustration, which do not constitute departures from the spirit and scope of the invention.

We claim:
1. In making N,N'-bis(alkoxymethyl) uron resin compositions by condensing 1 mol of urea with at least approximately 4 mols of formaldehyde, removing water from the resulting condensate, admixing an aliphatic alco- hol with the dehydrated condensate and acidifying the solution so made so as to etherify said condensate and form N,N'-bis(alkoxymethyl) uron resin composition, the improvement which comprises adjusting the pH of said uron resin composition to at least about 7, then introducing into said uron resin composition from about 0.04 to about 0.8 amine equivalent per mol of condensed urea of a water soluble amine selected from the group consisting of aliphatic amines and cycloalkyl amines, said amine having from one to six carbon atoms and causing said amine to react with said uron resin composition until the pH thereof ceases to fall appreciably and remains substantially constant.

2. The process of claim 1 which includes the step of heating said uron resin composition of substantially constant pH to evaporate excess alcohol therefrom.

3. The process of claim 1 which includes the step of evaporating excess alcohol from said uron resin composition following etherification of said condensate to form the same and prior to introducing said amine.

4. The process of claim 1 in which said aliphatic amine is selected from the group consisting of alkyl, alkanol, alkoxyalkyl, and alkylene amines.

5. The process of claim 1 in which said amine is introduced into said uron resin composition in an amount from about 0.06 to about 0.6 amine equivalent per mol of condensed urea.

6. The process of claim 1 in which said amine is caused to react with said uron resin composition at a temperature of about 60° C. to about 80° C.

7. The process of claim 1 in which said amine is ethyl amine.

8. The process of claim 1 in which said amine is ethanol amine.

9. In making N,N'-bis(alkoxymethyl) uron resin compositions by condensing 1 mol of urea with at least approximately 4 mols of formaldehyde, removing water from the resulting condensate, admixing an aliphatic alcohol with the dehydrated condensate and acidifying the solution so made so as to etherify said condensate and form N,N'-bis(alkoxymethyl) uron resin composition, the improvement which comprises adjusting the pH of said uron resin composition to at least about 7, then introducing into said uron resin composition from about 0.04 to about 0.8 amine equivalent per mol of condensed urea of a water soluble acetoxyalkyl amine having from one to six carbon atoms and causing said amine to react with said uron resin composition until the pH thereof ceases to fall appreciably and remains substantially constant.

10. An improved uron resin composition which comprises a reaction product of a manufactured N,N'-bis (alkoxymethyl) uron resin composition containing unreacted non-uron resin residues and from about 0.04 to about 0.8 amine equivalent per mol of condensed urea of a water soluble amine selected from the group consisting of aliphatic amines and cycloalkylamines, said amine having from one to six carbon atoms, said N,N'-bis(alkoxymethyl) uron resin composition being manufactured by condensation of urea with formaldehyde in the proportions of at least 4 mols of formaldehyde per mol of urea, and by dehydration and etherification of the resulting condensate with an aliphatic alcohol.

11. A composition as in claim 10 in which said aliphatic amine is selected from the group consisting of alkyl, alkanol, alkoxyalkyl, and alkylene amines.

12. A composition as in claim 10 in which said amine is ethyl amine.

13. A composition as in claim 10 in which said amine is ethanol amine.

14. A composition as in claim 10 in which said amine is reacted with said uron resin composition in an amount from about 0.06 to about 0.6 amine equivalent per mol of condensed urea.

15. An improved uron resin composition which comprises a reaction product of a manufactured N,N'-bis (alkoxymethyl) uron resin composition containing unreacted non-uron resin residues and from about 0.04 to about 0.8 amine equivalent per mol of condensed urea of a water soluble acetoxyalkyl amine having from one to six carbon atoms, said N,N'-bis(alkoxymethyl) uron resin composition being manufactured by condensation of urea with formaldehyde in the proportions of at least 4 mols of formaldehyde per mol of urea, and by dehydration and etherification of the resulting condensate with an aliphatic alcohol.

16. A modified textile material having improved resistance to chlorine degradation which comprises a textile material and applied thereto a reaction product of N,N'-bis(alkoxymethyl) uron resin composition containing unreacted non-uron resin residues and from about 0.04 to about 0.8 amine equivalent per mol of condensed urea of a water soluble amine selected from the group consisting of aliphatic amines and cycloalkyl amines, said amine having from one to six carbon atoms, said N,N'-bis (alkoxymethyl) uron resin composition being manufactured by condensation of urea with formaldehyde in the proportions of at least 4 mols of formaldehyde per mol of urea, and by dehydration and etherification of the resulting condensate with an aliphatic alcohol.

References Cited by the Examiner

UNITED STATES PATENTS

| | | | |
|---|---|---|---|
| 2,693,460 | 11/1954 | Gagliardi | 260—70 |
| 2,917,411 | 12/1959 | Kress | 177—139.4 |
| 3,063,869 | 11/1962 | Roth | 177—139.4 |
| 3,089,859 | 5/1963 | Oshima | 260—45.2 |

OTHER REFERENCES

American Dyestuff Reporter, vol. 48, No. 18, pages 37–40, Frick et al.; September 1959/American Dyestuff Reporter, vol. 48, No. 13, pages 23–25, Frick et al., June 1959.

American Dyestuff Reporter, vol. 47, No. 15, pages 505–508, July 1958.

Textile Industries, November 1958, pages 7–8.

SAMUEL H. BLECH, *Primary Examiner.*

WILLIAM H. SHORT, *Examiner.*

H. E. SCHAIN, *Assistant Examiner.*